US011210870B2

(12) United States Patent
Dudar et al.

(10) Patent No.: US 11,210,870 B2
(45) Date of Patent: Dec. 28, 2021

(54) ON-BOARD DIAGNOSTIC MONITOR PLANNING AND EXECUTION (71) Applicant: FORD GLOBAL TECHNOLOGIES, LLC, Dearborn, MI (US)

(72) Inventors: Aed M. Dudar, Canton, MI (US); Fling Tseng, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 411 days.

(21) Appl. No.: 16/283,914

(22) Filed: Feb. 25, 2019

(65) Prior Publication Data

US 2020/0273262 A1     Aug. 27, 2020

(51) Int. Cl.
G07C 5/00       (2006.01)
G07C 5/08       (2006.01)
G06F 16/29      (2019.01)

(52) U.S. Cl.
CPC .......... G07C 5/008 (2013.01); G06F 16/29 (2019.01); G07C 5/0808 (2013.01); G07C 5/0841 (2013.01)

(58) Field of Classification Search
CPC .... G07C 5/008; G07C 5/0808; G07C 5/0841; G06F 16/29; G06F 9/44505
See application file for complete search history.

(56) References Cited

U.S. PATENT DOCUMENTS

| | | |
|---|---|---|
| 9,384,597 B2 | 7/2016 | Koch et al. |
| 9,824,512 B2 | 11/2017 | Tseng et al. |
| 2005/0273218 A1* | 12/2005 | Breed ............... B60R 21/20 701/2 |
| 2006/0142905 A1* | 6/2006 | Brozovich .......... G07C 5/008 701/31.4 |
| 2007/0005202 A1* | 1/2007 | Breed ............... G07C 5/008 701/29.1 |
| 2007/0271014 A1* | 11/2007 | Breed ............... B60R 19/483 701/31.9 |
| 2008/0258890 A1* | 10/2008 | Follmer ............ B60R 25/102 340/439 |
| 2012/0004804 A1* | 1/2012 | Beams ............. G01S 5/0027 701/32.7 |
| 2012/0089299 A1* | 4/2012 | Breed ............... B60N 2/888 701/36 |

* cited by examiner

Primary Examiner — Richard M Camby
(74) Attorney, Agent, or Firm — Michael J. Spenner; Brooks Kushman P.C.

(57) ABSTRACT

A first controller receives a diagnostic recommendation from a cloud server. A second controller, in communication with the first controller over a vehicle bus, responsive to occurrence of a vehicle condition triggering execution of an on-board diagnostic (OBD) monitor, suspends the execution of the OBD monitor while the vehicle is within a region specified by the diagnostic recommendation. Locations in diagnostic result data are correlated to identify clusters of locations that include at least a predetermined number of executions of an on-board diagnostic (OBD) monitor. Responsive to a predicted probability of success of execution of the OBD monitor for one of the clusters of locations computed using the diagnostic result data being below an enablement threshold, a message is sent to a vehicle suspending further executions of the OBD monitor at the location.

20 Claims, 4 Drawing Sheets

ON-BOARD DIAGNOSTIC MONITOR PLANNING AND EXECUTION

TECHNICAL FIELD

Aspects of the disclosure generally relate to planning and execution of on-board diagnostic monitors.

BACKGROUND

On-board diagnostics (OBD) relate to self-diagnostic and reporting capabilities of a vehicle. OBD systems give the vehicle owner or repair technician access to the status of the various vehicle subsystems. OBD-II provides access to data from the engine control unit (ECU) and offers a valuable source of information when troubleshooting problems inside a vehicle. A vehicle may include an OBD port that provides access to the OBD diagnostic information. OBD scanner devices may be connected to the OBD port and are used to receive and analyze the diagnostic information.

SUMMARY

In one or more illustrative examples, a vehicle includes a first controller configured to receive a diagnostic recommendation from a cloud server. The vehicle also includes a second controller, in communication with the first controller over a vehicle bus, configured to, responsive to occurrence of a vehicle condition triggering execution of an on-board diagnostic (OBD) monitor, suspend the execution of the OBD monitor while the vehicle is within a region specified by the diagnostic recommendation.

In one or more illustrative examples, a system includes a memory storing diagnostic result data from a plurality of vehicles, each diagnostic result data entry including data indicative of whether execution of an OBD monitor by a vehicle was completed successfully and a location of the vehicle during execution of the OBD monitor. The system also includes a processor programmed to, responsive to a predicted probability of success of execution of the OBD monitor for a location, computed using the diagnostic result data, being below an enablement threshold, send a message to the vehicles suspending further executions of the OBD monitor at the location.

In one or more illustrative examples, a method includes correlating locations in diagnostic result data identifying clusters of locations including at least a predetermined number of executions of an on-board diagnostic (OBD) monitor; and responsive to a predicted probability of success of execution of the OBD monitor for one of the clusters of locations computed using the diagnostic result data being below an enablement threshold, sending a message to a vehicle suspending further executions of the OBD monitor at the location.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

OBD monitors are self-check routines executed by vehicle electronics to provide insights into operation of the vehicle. Some examples of OBD monitors include routines for monitoring EVAP, EGR, $O_2$ sensors (which may include sensors at the front and/or the back of the vehicle), misfire detection, and catalysts. Some OBD monitors are continuous and log regardless of circumstance. Other are rate based, meaning they are activated during or post driving. As some example conditions for executing a rate-based monitor, monitoring may be triggered responsive to one or more of engine coolant temperature reaching a predefined temperature, closed loop fuel control, or steady state vehicle cruising conditions.

Each rate-based monitor may execute, at most, once per trip, and only responsive to satisfaction of the trigger criteria for initiation of the monitor. As a result, each rate-based monitor may have a unique in-use monitoring performance (IUMP) number. IUMP may be subject to regulations (for instance, emissions regulations) such that a monitor is to be effective at detecting a fault, and also fully executed at a sufficient rate as defined by the regulations. For instance, vehicles sold in North America may be required to perform EVAP leak detection as part of OBD-II requirements. Green states require vehicles to monitor for 0.02" leaks as part of the Clean Air Act (CAA) Section 177. As of model year 2017, each state of the United States had a requirement for performance of the 0.02" leak test. The 0.02" leak test also has a completion frequency requirement called In-Use Monitoring Performance (IUMP) of 26%. The gross leak check must have an IUMP rate of 62%.

In some circumstances, vehicles may be unable to run OBD monitors often enough to achieve a requested rate. Some causes for this may include driver habits (e.g., mismatch of the trips performed in the vehicle as compared to the trigger conditions necessary to involve the monitor), or road and ambient conditions that allowed for the triggering of a monitor where subsequent events prevent the monitor from completing successfully (such as bumpy/winding/undulating roads, fuel sloshing, strong wind/rain, and wet road surfaces taking heat away post driving). For instance, a misfire monitor may be influenced by rough roads as the acceleration anomaly of the crank wheel during a rough road mimics a misfire. As another example, rough, windy or hilly roads may cause fuel slosh and increased vapor generation which confounds EVAP leak detection results, giving either false positive or false negative results.

If a drive cycle ends without finishing the diagnostic, the vehicle may be unable to receive credit for it, resulting in low IUMP numbers. The disclosed approaches utilize vehicle connectivity to improve probability that a OBD diagnostic monitor will complete successfully. As diagnostics are imperfect and can trigger a false code when a certain stack-up of noise factors is realized, it is paramount to either try to abort the diagnostic or to not execute it at all.

Diagnostics are also intrusive and too many aborts can dilute the ideal function of the control system associated with the diagnostic. For example, when the EVAP system is conducting a diagnostic by closing the CVV valve, the canister cannot be purged. Since engine run time is limited in future engines, this can cause increase in evaporative emissions if too many execution/aborts occur.

Responsive to completion of an OBD monitor by a vehicle, the vehicle may be configured to report the outcome of the diagnostic to a cloud server. This outcome may indicate a success status of the OBD monitor, such as one of abort, pass, or fail. The outcome may be included in diagnostic result data, which may also include other information such as location coordinates of the vehicle when the monitoring was initiated and when the monitoring concluded. When a vehicle is travelling and the OBD monitor entry conditions are met, prior to investing in a diagnostic session, the approach may perform a simple calculation of the probability that the diagnostic will complete successfully without false failures.

Figure 1:
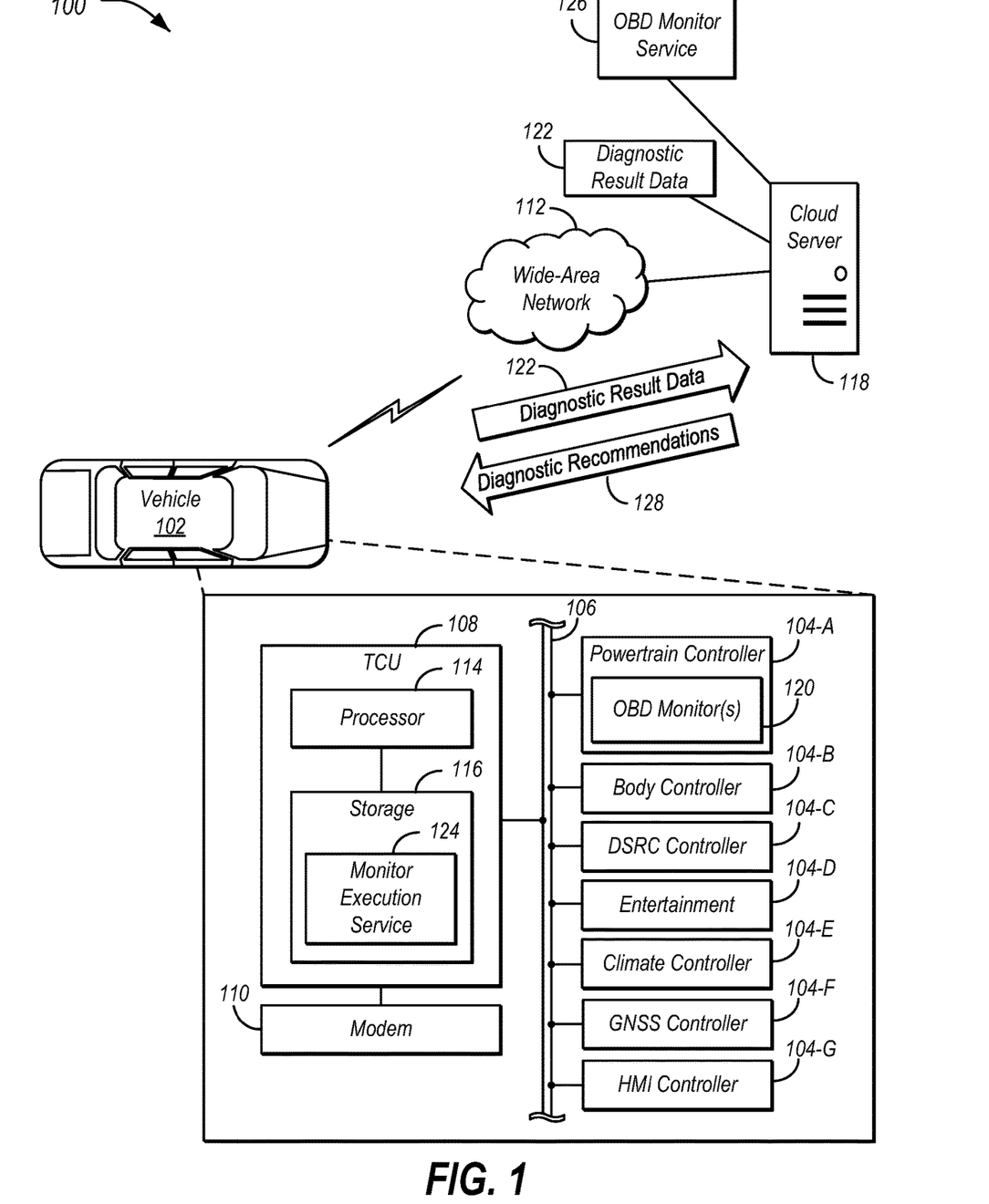
FIG. 1 illustrates an example system for the smart performance of OBD monitors.

FIG. 1 illustrates an example system 100 for the smart performance of OBD monitors 120. As illustrated, the vehicles 102 includes a plurality of vehicle electronic control units (ECUs) or vehicle controllers 104 in communication over one or more vehicle buses 106. One or more OBD monitors 120 may be installed to the controllers 104 and may be executed by the controllers 104 to perform various diagnostics. The system 100 also includes a cloud server 118 configured to maintain diagnostic result data 122. The cloud server 118 may utilize an OBD monitor service 126 to determine optimal times for the vehicle 102 to perform the OBD monitors 120. The vehicle 102 further includes a telematics control unit (TCU) 108 configured to send diagnostic result data 122 to the cloud server 118, as well as to receive from the OTA cloud server 118 diagnostic result data 122 indicating suggested times to avoid performing the OBD monitors 120. The TCU 108 may utilize a monitor results service 124 to receive the diagnostic result data 122 as well as to provide the diagnostic success data 122 to the cloud server 118. It should be noted that the system 100 is merely an example, and other arrangements or combinations of elements may be used. For instance, OBD monitors 120 may be installed to more or different controllers 104 of the vehicles 102.

The vehicle 102 may include various types of automobile, crossover utility vehicle (CUV), sport utility vehicle (SUV), truck, recreational vehicle (RV), boat, plane or other mobile machine for transporting people or goods. In many cases, the vehicle 102 may be powered by an internal combustion engine. As another possibility, the vehicle 102 may be a hybrid electric vehicle (HEV) powered by both an internal combustion engine and one or more electric motors, such as a series hybrid electric vehicle (SHEV), a parallel hybrid electrical vehicle (PHEV), or a parallel/series hybrid electric vehicle (PSHEV). As the type and configuration of vehicle 102 may vary, the capabilities of the vehicle 102 may correspondingly vary. As some other possibilities, vehicles 102 may have different capabilities with respect to passenger capacity, towing ability and capacity, and storage volume. For title, inventory, and other purposes, vehicles 102 may be associated with unique identifiers, such as VINs.

The vehicle 102 may include a plurality of controllers 104 configured to perform and manage various vehicle 102 functions under the power of the vehicle battery and/or drivetrain. As depicted, the example vehicle controllers 104 are represented as discrete controllers 104-A through 104-G. However, the vehicle controllers 104 may share physical hardware, firmware, and/or software, such that the functionality from multiple controllers 104 may be integrated into a single controller 104, and that the functionality of various such controllers 104 may be distributed across a plurality of controllers 104.

As some non-limiting vehicle controller 104 examples: a powertrain controller 104-A may be configured to provide control of engine operating components (e.g., idle control components, fuel delivery components, emissions control components, etc.) and for monitoring status of such engine operating components (e.g., status of engine codes); a body controller 104-B may be configured to manage various power control functions such as exterior lighting, interior lighting, keyless entry, remote start, and point of access status verification (e.g., closure status of the hood, doors and/or trunk of the vehicle 102); a DSRC transceiver controller 104-C may be configured to communicate with key fobs, mobile devices, or other local vehicle 102 devices; an entertainment controller 104-D may be configured to support voice command and BLUETOOTH interfaces with the driver and driver carry-on devices; a climate control management controller 104-E may be configured to provide control of heating and cooling system components (e.g., compressor clutch, blower fan, temperature sensors, etc.); a global navigation satellite system (GNSS) controller 104-F may be configured to provide vehicle location information; and a human-machine interface (HMI) controller 104-G may be configured to receive user input via various buttons or other controls, as well as provide vehicle status information to a driver, such as fuel level information, engine operating temperature information, and current location of the vehicle 102.

The vehicle bus 106 may include various methods of communication available between the vehicle electronic control units (ECUs) 104, as well as between the TCU 108 and the vehicle ECUs 104. As some non-limiting examples, the vehicle bus 106 may include one or more of a vehicle controller area network (CAN), an Ethernet network, and a media-oriented system transfer (MOST) network. Further aspects of the layout and number of vehicle buses 106 are discussed in further detail below.

The TCU 108 may include network hardware configured to facilitate communication between the vehicle ECUs 104 and with other devices of the system 100. For example, the TCU 108 may include or otherwise access a cellular modem 110 configured to facilitate communication with a wide-area network 112. The wide-area network 112 may include one or more interconnected communication networks such as the Internet, a cable television distribution network, a satellite link network, a local area network, and a telephone network, as some non-limiting examples. As another example, the TCU 108 may utilize one or more of BLUETOOTH, Wi-Fi, or wired USB network connectivity to facilitate communication with the wide-area network 112 via the user's mobile device.

The TCU 108 may further include various types of computing apparatus in support of performance of the functions of the TCU 108 described herein. In an example, the TCU 108 may include one or more processors 114 configured to execute computer instructions, and a storage 116 medium on which the computer-executable instructions and/or data may be maintained. A computer-readable storage medium (also referred to as a processor-readable medium or storage 116) includes any non-transitory (e.g., tangible) medium that participates in providing data (e.g., instructions) that may be read by a computer (e.g., by the processor(s)). In general, the processor 114 receives instructions and/or data, e.g., from the storage 116, etc., to a memory and executes the instructions using the data, thereby performing one or more processes, including one or more of the processes described herein. Computer-executable instructions may be compiled or interpreted from computer programs created using a variety of programming languages and/or technologies, including, without limitation, and either alone or in combination, JAVA, C, C++, C #, FORTRAN, PASCAL, VISUAL BASIC, PYTHON, JAVA SCRIPT, PERL, PL/SQL, etc.

The TCU 108 may be configured to include one or more interfaces from which vehicle information may be sent and received. In an example, the TCU 108 may be configured to facilitate the collection of diagnostic trouble code (DTC) data and/or other vehicle information from the vehicle controllers 104 connected to the one or more vehicle buses 106. While only a single bus 106 is illustrated, it should be noted that in many examples multiple vehicle buses 106 are included, with a subset of the controllers 104 connected to each bus 106. Accordingly, to access a given controller 104, the TCU 108 may be configured to maintain a mapping of which buses 106 are connected to which controllers 104, and to access the corresponding bus 106 for a controller 104 when communication with that particular controller 104 is desired.

The cloud server 118 may include various types of computing apparatus, such as a computer workstation, a server, a desktop computer, a virtual server instance executed by a mainframe server, or some other computing system and/or device. Similar to the TCU 108, the cloud server 118 generally includes a memory on which computer-executable instructions may be maintained, where the instructions may be executable by one or more processors (not shown for clarity). Such instructions and other data may be stored using a variety of computer-readable media. In a non-limiting example, the cloud server 118 may be configured to maintain the diagnostic result data 122 and the OBD monitor service 126.

The OBD monitors 120 may include self-check routines executed by the vehicle controllers 104 to provide insights into operation of the vehicle 102. Some examples of OBD monitors 120 include routines for monitoring EVAP, EGR, $O_2$ sensors, misfire detection, and catalysts. The OBD monitors 120 may be services included on the controller 104 to perform the given diagnostics.

The diagnostic result data 122 may include data related to the execution of the OBD monitor 120. This data may include a success status indicating whether the OBD monitor 120 completed successfully or not. Example success status codes may include, for instance, one of abort, pass, or fail. The diagnostic result data 122 may also include other information such as location coordinates of the vehicle 102 when the OBD monitor 120 was initiated and when the OBD monitor 120 concluded.

The monitor execution service 124 may be one application included on the storage 116 of the TCU 108. The monitor execution service 124 may include instructions that, when executed by the processor 114 of the TCU 108, cause the TCU 108 to perform functions in relation to scheduling OBD monitors 120, updating vehicles settings in anticipation of execution of OBD monitors 120, and reporting diagnostic results data 122 regarding the OBD monitors 120 to the cloud server 118.

The OBD monitor service 126 may be an application included on the storage of the cloud server 118. The OBD monitor service 126 may include instructions that, when executed by one or more processors of the cloud server 118, cause the cloud server 118 to receive the diagnostic results data 122 from the vehicles 102, as well as make recommendations to vehicles 102 with regard to when to execute the OBD monitors 120. The OBD monitor service 126 may also be programmed to perform reasoning and sensitivity analysis on additional content not available from the vehicle 102 to identify root-causes of OBD monitor 120 abort events. This reasoning may include previewing potential interruptions indicated by the off-board content, as well as previewing stopping patterns associated with a specific OBD monitor 120 (e.g., a predicted stop duration for an EVAP EONV).

The OBD monitor service 126 may also be programmed to provide diagnostic recommendations 128 to promote the successful execution of the OBD monitors 120. In an example, the diagnostic recommendations 128 may include one or more actions to be performed by the vehicle 102 in order to increase the likelihood of success of an OBD monitor 120. As an example, an action may include adjusting an active suspension control to temporarily engage in comfort mode to reduce road contents propagation. As another example, an action may include using intelligent speed control (ACC) to make minor speed regulations to increase time in favorable conditions and reduce time in unfavorable conditions. As yet another example, an action may include requesting a parking advisor to recommend indoor parking if an OBD monitor 120 for EVAP EONV is scheduled to execute and unfavorable ambient conditions are expected. The diagnostic recommendations 128 also include additional information, such as a listing of geographic locations (e.g., GNSS location coordinates) at which execution of OBD monitors 120 should be avoided.

Figure 2:
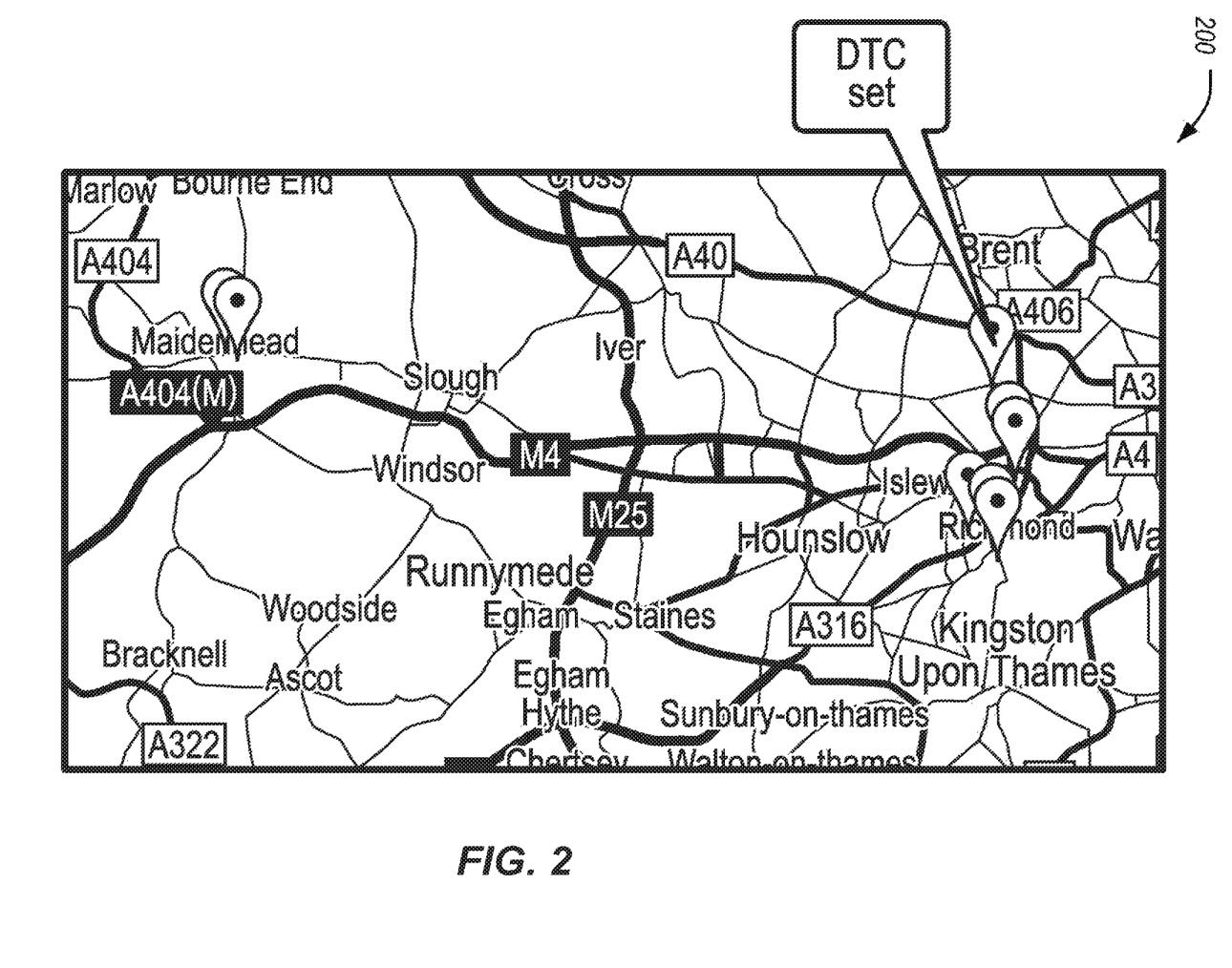
FIG. 2 illustrates an example of a map showing crowd-sourced diagnostic result data along a travel route.

FIG. 2 illustrates an example 200 of a map 202 showing crowd-sourced diagnostic result data 122 along a travel route. The map 202 illustrates a geographic area, while each of the marked locations 204 indicates a position of a vehicle 102 at which a DTC was issued according to the diagnostic result data 122. As can be seen in the illustration, certain areas have clusters of marked locations 204, indicating that OBD monitors 120 at those locations have failed. As vehicle dynamics and road surfaces play a significant role in robustness of performance of OBD monitors 120, execution success of the OBD monitor 120 may be improved by calculating a success probability of successful execution of the OBD monitor 120 as determined from crowd-sourced data from vehicles 102. Accordingly, the diagnostic result data 122 may be analyzed by the OBD monitor service 126 of the cloud server 118 as discussed in detail below.

A probability of success of execution of an OBD monitor 120 may be determined according to the crowd-sourced diagnostic result data 122. For example, if one hundred vehicles 102 traversed a route of interest and attempted execution of a particular OBD monitor 120, and execution of the OBD monitor 120 on fifty of the vehicles 102 resulted in an abort (e.g., due to road roughness, fuel slosh, etc.), then a 50% abort probability may be identified for performance of the OBD monitor 120 along the given route as follows:

$$P(A)=50/100=50\% \tag{1}$$

A 50% change of failure may be deemed too high to be investing in a diagnostic. Accordingly, an OBD monitor 120 planned to be performed along the given route may be postponed. Notably, this approach may impose a requirement of a minimum population size for each OBD monitor 120. In one example, a mature population size of at least thirty points for each OBD monitor 120 may be required.

If the completion ratio is sufficient for performing the OBD monitor 120, and if the diagnostic result data 122 includes success data, a further probability analysis may be performed to compute a probability of the OBD monitor 120 both completing (probability A) and passing (probability B). Hence, if the completion rate for the diagnostic is 90% and the pass rate is 98%, then the probability that the diagnostic will run to fruition and also pass is given by:

$$P(A \text{ and } B) = P(A) \times P(B) = 0.9 \times 0.98 = 0.882 \quad (2)$$

An enablement threshold may be used to determine whether to conduct a diagnostic at given geographic coordinates. If the product given by equation (2) is sufficient (e.g., meets a predefined threshold minimum, such as 95% for instance), then the diagnostic may be allowed to be performed by the vehicle 102. If, on the other hand, the value fails to exceed the predefined threshold minimum, then the OBD execution for the OBD monitor 120 may be postponed. It should be noted that simple probabilities are used in many examples in this disclosure. However, other probabilistic techniques may be used to predict results, such as cosine correlation.

As most OBD DTCs are two trip malfunction indicator lamps (MILs), that is, it takes two different trips to set the MIL lights, the first failure is a pending code and the second consecutive failure is a confirmed code. If a pass occurs after the first pending DTC, then the described approach polls vehicles 102 that set the DTC at the suspect GPS tag to see if another consecutive DTC set on a later route/GPS coordinate or if the pending DTC was healed by a successful diagnostic execution and pass call. If the majority of the population of vehicles 102 that set a DTC at the first GPS tag later healed the code by passing the diagnostic on a different route and trip, then the original GPS geotag is prone to false fails and may be quarantined as unfriendly to OBD diagnostics.

Regarding favorability vs. severity, total favorability may be defined as shown in equation (3), while total severity may be defined as shown in equation (4):

$$F = f(i) * d(i) * p_f(i) \quad (3)$$

$$S = s(i) * d(i) * p_s(i) \quad (4)$$

where:
s is a continuous quantifiable indicator of unfavorable conditions;
f is a continuous quantifiable indicator of favorable conditions;
d is a segment distance; and
p is a probability of the occurrences of favorable/unfavorable conditions.

Over time, F for variable lengths of segments may be associated with likelihoods of successful OBD monitor 120 executions. For example, if C is defined as total pending failures at a given location and D is defined as total confirmed failures at a second given location, then a probability of MIL status DTC failures at those locations is computed as follows:

$$P(C \text{ and } D) = P(C) \times P(D) \quad (5)$$

If P(C) is high and P(D) is low and the ratio is very low, then the DTC is likely a false call. If the ratio is high, then the DTC is more likely due to a true failure. Route with location C may then be blocked from running OBD diagnostics since such diagnostics result in a high failure rate that is healed later on at location D. Hence crowd-based filtering may be performed to block road segment locations from executing OBD diagnostics due to high probability of false failures. If, however, a DTC goes to MIL by failing on two different routes' locations and on two different trips, then the likelihood of vehicle having a real failure is high. Since location coordinates (such as GNSS coordinates) are absolute and have an error, a mileage range is establish surrounding the coordinates in the analysis (e.g., +/− X miles for the given GNSS coordinates).

Drive route segments that result in a lack of OBD execution or in poor OBD execution results are tagged as OBD unfriendly. Accordingly, the cloud server 118 may inform other vehicles 102 of the high risk in the diagnostic recommendations 128 sent to the vehicles 102. Peer vehicles may suspend OBD execution in that route segment to maintain OBD diagnostic robustness and high IUMP ratios. In doing so, the system 100 may achieve a reduced number of OBD diagnostic aborts and improved diagnostic robustness, based on the crowd-sourced aggregated data of proven and successful OBD diagnostic runs at tagged GNSS locations.

Figure 3:
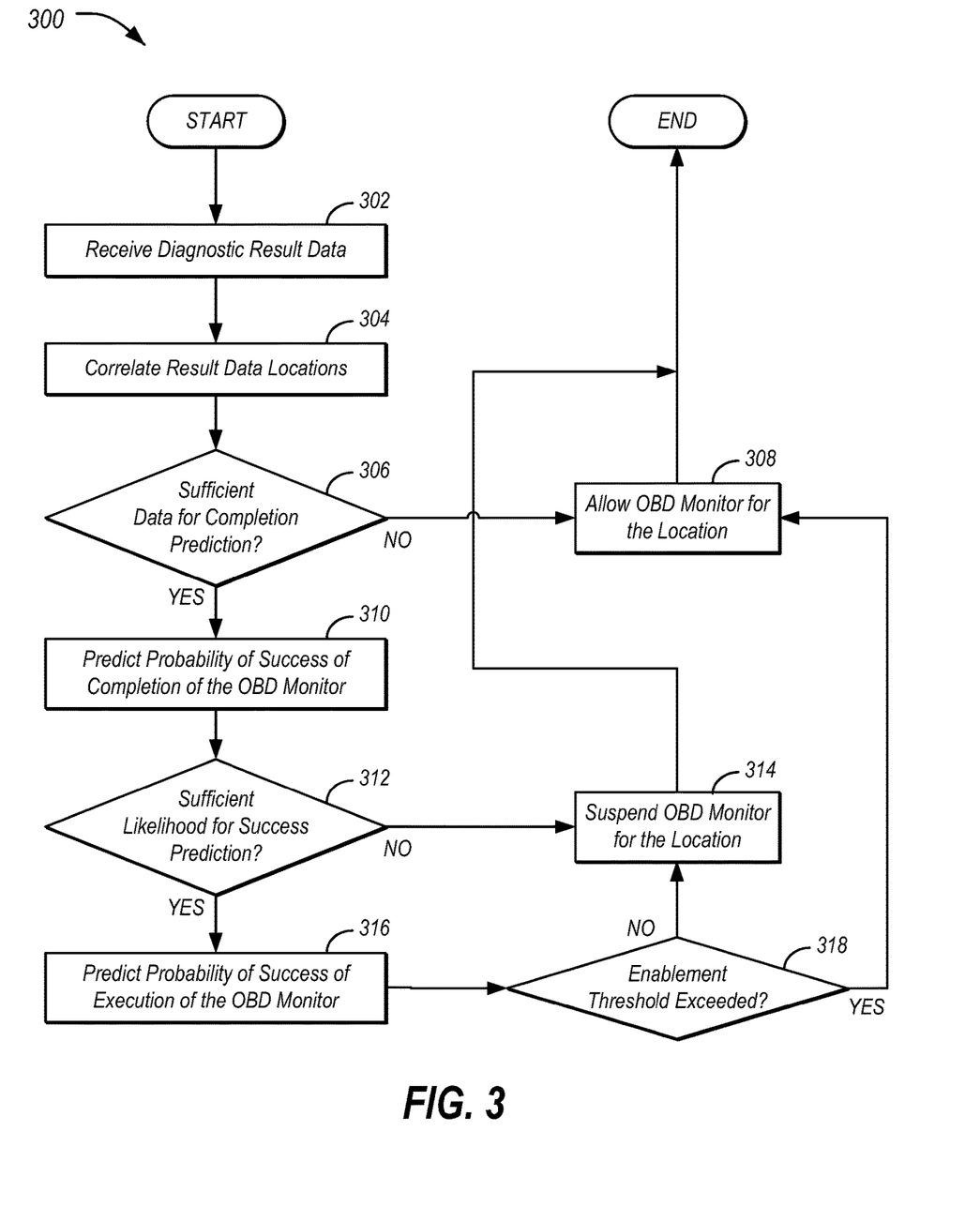
FIG. 3 illustrates an example process for sending diagnostic recommendations for OBD monitors based on diagnostic result data.

FIG. 3 illustrates an example process 300 for sending diagnostic recommendations 128 for OBD monitors 120 based on diagnostic result data 122. In an example, the process 300 may be performed by the OBD monitor service 126 executed by the cloud server 118 in communication with the vehicles 102 over the wide-area network 112.

The cloud server 118 receives diagnostic result data 122 at operation 302. In an example, the cloud server 118 may receive diagnostic result data 122 from vehicles 102 responsive to the vehicles 102 completing OBD monitors 120. In another example, the cloud server 118 may periodically receive diagnostic result data 122 from the vehicles 102. In yet a further example, the cloud server 118 may poll the vehicles 102 for diagnostic result data 122.

At 304, the cloud server 118 correlates the diagnostic result data 122 according to location. In an example, the cloud server 118 may identify GNSS coordinates or other location information in the diagnostic result data 122 indicative of the locations of initiation and termination of the OBD monitors 120. Using the coordinates, the cloud server 118 may perform clustering or other data analytics on the locations to correlates the diagnostic result data 122 according to location.

At operation 306, the cloud server 118 determines whether sufficient diagnostic result data 122 exists for the locations to perform completion prediction. In an example, the cloud server 118 may compare the quantity of data of instances of diagnostic result data 122 at the clustered locations to a minimum population size threshold (e.g., thirty samples) for a given OBD monitor 120 (or for all OBD monitors 120 in another example) to determine whether probabilities can be computed for that OBD monitor 120 (or for all OBD monitors 120 together). If insufficient diagnostic result data 122 exists for certain locations, for those locations control passes to operation 308. If probabilities can be computed, control passes to operation 310.

The cloud server 118 allows OBD monitors 120 for the predicted locations at 308. In an example, the cloud server 118 may perform no operation in the case that vehicles 102 default to allowing OBD monitors 120 to be performed. In other examples, or in cases where the cloud server 118 may have previously suspended OBD monitors 120, the cloud server 118 sends diagnostic recommendations 128 to the vehicles 102 allowing the OBD monitors 120 to be performed at the indicated location(s). After operation 308, the process 300 ends.

At 310, the cloud server 118 predicts probability of success of completion of OBD monitors 120 at the locations having sufficient diagnostic result data 122. Examples of the prediction of success of completion are discussed in detail with respect to FIG. 2. At operation 312, the cloud server 118 determines whether a sufficient likelihood for prediction of completion of the OBD monitors 120 was predicted. In an example, the cloud server 118 compares the likelihood of completion to predefined completion ratio (e.g., 80%, 95%, etc.) to ensure that the completion ratio is sufficient for performing the OBD monitor 120. If the likelihood is not sufficient, control passes to operation 314. Otherwise, control passes to operation 316.

The cloud server 118 suspends OBD monitors 120 for the predicted locations at 314. In an example, the cloud server 118 sends diagnostic recommendations 128 to the vehicles 102 suspending the OBD monitors 120 to be performed at the indicated location(s). After operation 314, the process 300 ends.

At operation 316, the cloud server 118 predicts a probability of success of execution of the OBD monitors 120. Examples of the prediction of success of execution are discussed in detail with respect to FIG. 2. At 318, the cloud server 118 determines whether probability of the success of execution of the OBD monitors 120 exceeds the enablement threshold. If so, control passes to operation 308. If not, control passes to operation 314.

Figure 4:
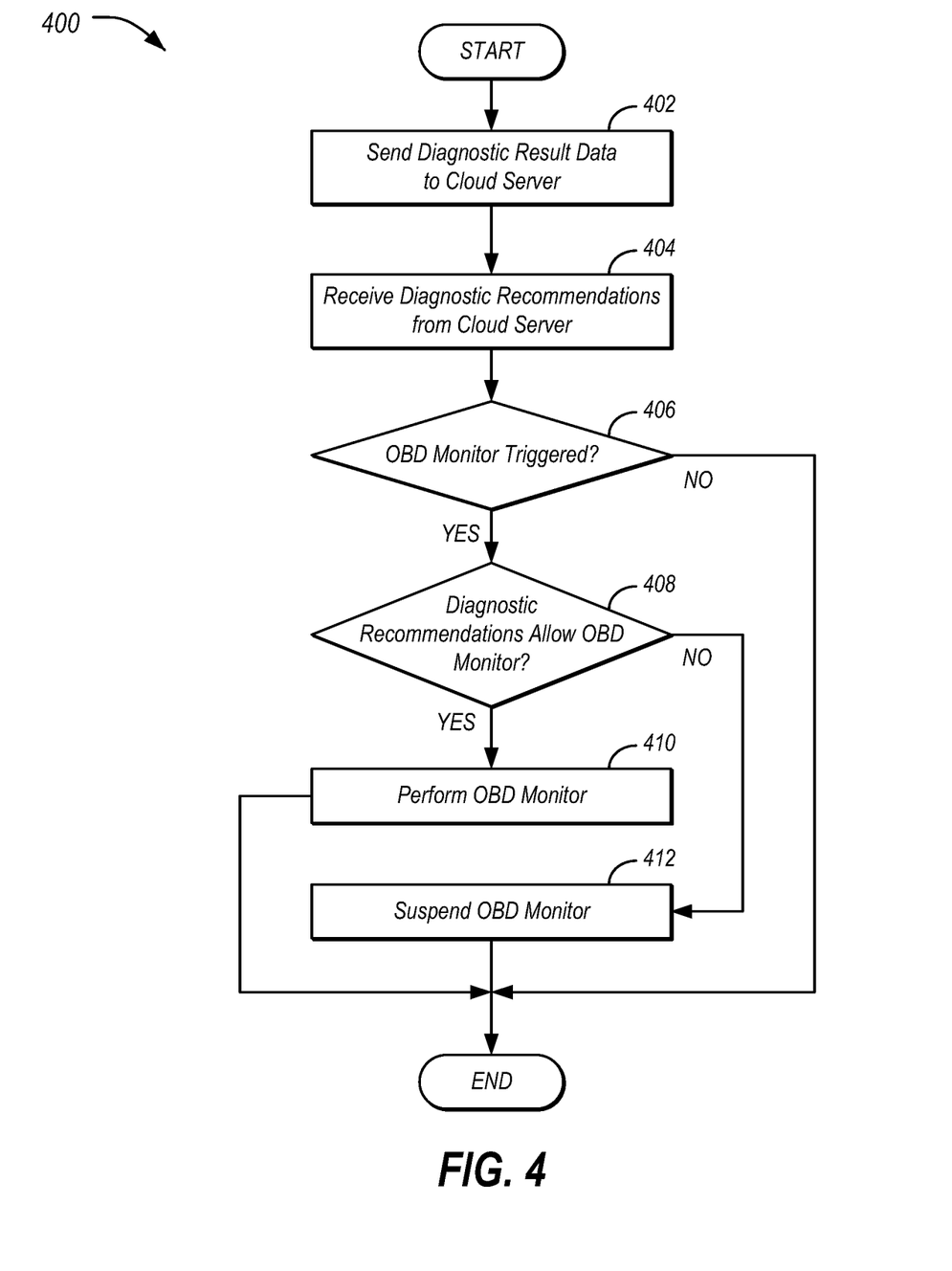
FIG. 4 illustrates an example process for the smart performance of OBD monitors as informed by the diagnostic recommendations.

FIG. 4 illustrates an example process 400 for the smart performance of OBD monitors 120 as informed by the diagnostic recommendations 128. In an example, the process 400 may be performed by components of the vehicle 102 in the context of the system 100, such as the TCU 108 executing the monitor execution service 124 in communication over the vehicle bus 106 with the controllers 104 configured to execute the OBD monitors 120.

At operation 402, the vehicle 102 sends diagnostic result data 122 to the cloud server 118. In an example, the sending may be performed by the TCU 108 of the vehicle 102 as described above with respect to operation 302 of the process 300. The vehicle 102 received diagnostic recommendations 128 from the cloud server 118 at 404. In an example, the receiving may be performed by the TCU 108 of the vehicle 102 as described above with respect to operations 308 and 314 of the process 300.

At 406, the vehicle 102 determines whether an OBD monitor 120 is triggered. In an example, the OBD monitor 120 may be triggered responsive to occurrence of various vehicle 102 conditions, some examples of which may include one or more of engine coolant temperature reaching a predefined temperature, closed loop fuel control, or steady state vehicle cruising conditions. Determination of whether the trigger conditions are met may be performed by the controller 104 hosting the OBD monitor 120. It should be noted that the trigger criteria may vary per OBD monitor 120. If an OBD monitor 120 is triggered, control passes to operation 408. If not, the process 400 ends.

The vehicle 102 determines whether the diagnostic recommendations 128 allow performance of the OBD monitor 120. In an example, the controller 104 hosting the triggered OBD monitor 120 may query the TCU 108 to ensure that the diagnostic may be run. In another example, the TCU 108 may have forwarded the diagnostic recommendations 128 regarding the OBD monitor 120 to the controller 104 hosting the OBD monitor 120, and the controller 104 may determine whether the performance of the OBD monitor 120 is allowed. If the diagnostic may be run, control passes to operation 410 to perform the OBD monitor 120. After operation 410, the process 400 ends. If, however, the OBD monitor 120 is not allowed, control passes to operation 412 to suspend the operation of the OBD monitor 120. For instance, the OBD monitor 120 may be canceled, or may be delayed until the vehicle 102 exits a region specified in the diagnostic recommendations 128 as being locations where the OBD monitor 120 should not run. After operation 412, the process 400 ends.

In sum, as OBD diagnostics are prone to alpha error, with connectivity there is unique opportunity to filter out alpha error by crowd comparison and geotagging GNSS locations when a DTC sets. Certain roads or terrains may be unfriendly to OBD diagnostics, for example as those terrains cause the vehicle 102 to bounce, oscillate or otherwise move in a manner that can cause generation of false positives or negatives in results for misfire, EVAP, or other OBD monitors 120. The crowd-sourced data may accordingly designate those routes as unfriendly and notify peers. Accordingly, before a vehicle 102 invests in an OBD diagnostic, the system 100 may survey historical success rate to ensure that the vehicle 102 is able to execute the OBD monitor 120 without aborting and with a low probability of alpha error.

Computing devices described herein, such as the controllers 104, TCU 108, and cloud server 118, generally include computer-executable instructions where the instructions may be executable by one or more computing devices such as those listed above. Computer-executable instructions, such as those of the monitor execution service 124 or OBD monitor service 126, may be compiled or interpreted from computer programs created using a variety of programming languages and/or technologies, including, without limitation, and either alone or in combination, JAVA™, C, C++, C #, VISUAL BASIC, JAVASCRIPT, PYTHON, JAVASCRIPT, PERL, PL/SQL, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
   a first controller configured to receive a diagnostic recommendation from a cloud server, the diagnostic recommendation suspending execution of an on-board diagnostic (OBD) monitor at a region at which the vehicle is located responsive to a predicted probability of success of the execution of the OBD monitor at the region being below an enablement threshold as computed by the cloud server using diagnostic result data from vehicles previously at the region; and
   a second controller, in communication with the first controller over a vehicle bus, configured to, responsive to occurrence of a vehicle condition triggering execution of the OBD monitor, suspend the execution of the OBD monitor while the vehicle is within a region specified by the diagnostic recommendation.

2. The vehicle of claim 1, wherein the second controller is further programmed to, responsive to occurrence of the vehicle condition triggering execution of an on-board diagnostic (OBD) monitor, initiate the execution of the OBD monitor while the vehicle is not within the region specified by the diagnostic recommendation.

3. The vehicle of claim 1, wherein the first controller is further configured to send diagnostic result data to the cloud server, the diagnostic result data indicating whether or not the execution of the OBD monitor completed successfully and a location of the vehicle at initiation of the OBD monitor.

4. The vehicle of claim 3, wherein the diagnostic result data further indicates a location of the vehicle at termination of the OBD monitor.

5. The vehicle of claim 1, wherein the OBD monitor includes a routine for monitoring one or more of EVAP, EGR, $O_2$ sensors, misfire detection, or catalyst measurement.

6. The vehicle of claim 1, wherein the region specified by the diagnostic recommendation includes a radial distance surrounding location coordinates included in the diagnostic recommendation.

7. A system comprising:
   a memory storing diagnostic result data from a plurality of vehicles, each diagnostic result data entry including data indicative of whether execution of an on-board diagnostic (OBD) monitor by a vehicle was completed successfully and a location of the vehicle during execution of the OBD monitor; and
   a processor programmed to
      responsive to a predicted probability of success of execution of the OBD monitor for a location computed using the diagnostic result data being below an enablement threshold, send a message to the vehicles suspending further executions of the OBD monitor at the location.

8. The system of claim 7, wherein the processor is further programmed to, responsive to the diagnostic result data for a location including at least a predetermined number of executions of an OBD monitor, predict a probability of success of completion of the OBD monitor at the location based on the data indicative of whether execution of the OBD monitor was completed successfully at the location.

9. The system of claim 8, wherein the processor is further programmed to cluster locations in the diagnostic result data to identify locations that include at least the predetermined number of executions of an OBD monitor.

10. The system of claim 8, wherein the probability of success of completion is computed as a ratio of successful executions at the location to all executions at the location.

11. The system of claim 7, wherein the processor is further programmed to, responsive to the diagnostic result data for a location lacking at least a predetermined number of executions of an OBD monitor, send a message to the vehicles allowing further executions of the OBD monitor at the location.

12. The system of claim 7, wherein the processor is further programmed to receive the diagnostic result data from the plurality of vehicles.

13. The system of claim 7, wherein the message to the vehicles suspending further executions of the OBD monitor at the location includes coordinates of the location.

14. A method comprising:
   correlating locations in diagnostic result data identifying clusters of locations including at least a predetermined number of executions of an on-board diagnostic (OBD) monitor; and
   responsive to a predicted probability of success of execution of the OBD monitor for one of the clusters of locations computed using the diagnostic result data being below an enablement threshold, sending a message to a vehicle suspending further executions of the OBD monitor at the location.

15. The method of claim 14, further comprising predicting a probability of success of completion of the OBD monitor at the one of the clusters of locations based on data included in the diagnostic result data indicative of whether execution of the OBD monitor was completed successfully at the location.

16. The method of claim 15, further comprising computing the probability of success of completion as a ratio of successful executions at the location to all executions at the location.

17. The method of claim 15, further comprising, responsive to the diagnostic result data for a location lacking at least a predetermined number of executions of an OBD monitor, sending a message to the vehicle allowing further executions of the OBD monitor at the location.

18. The method of claim 14, further comprising receiving the diagnostic result data from a plurality of vehicles.

19. The method of claim 14, further comprising including coordinates of the location in the message.

20. The vehicle of claim 1, wherein the diagnostic recommendation further includes one or more actions to be performed by the vehicle in order to increase a likelihood of success of the OBD monitor.

\* \* \* \* \*